UNITED STATES PATENT OFFICE.

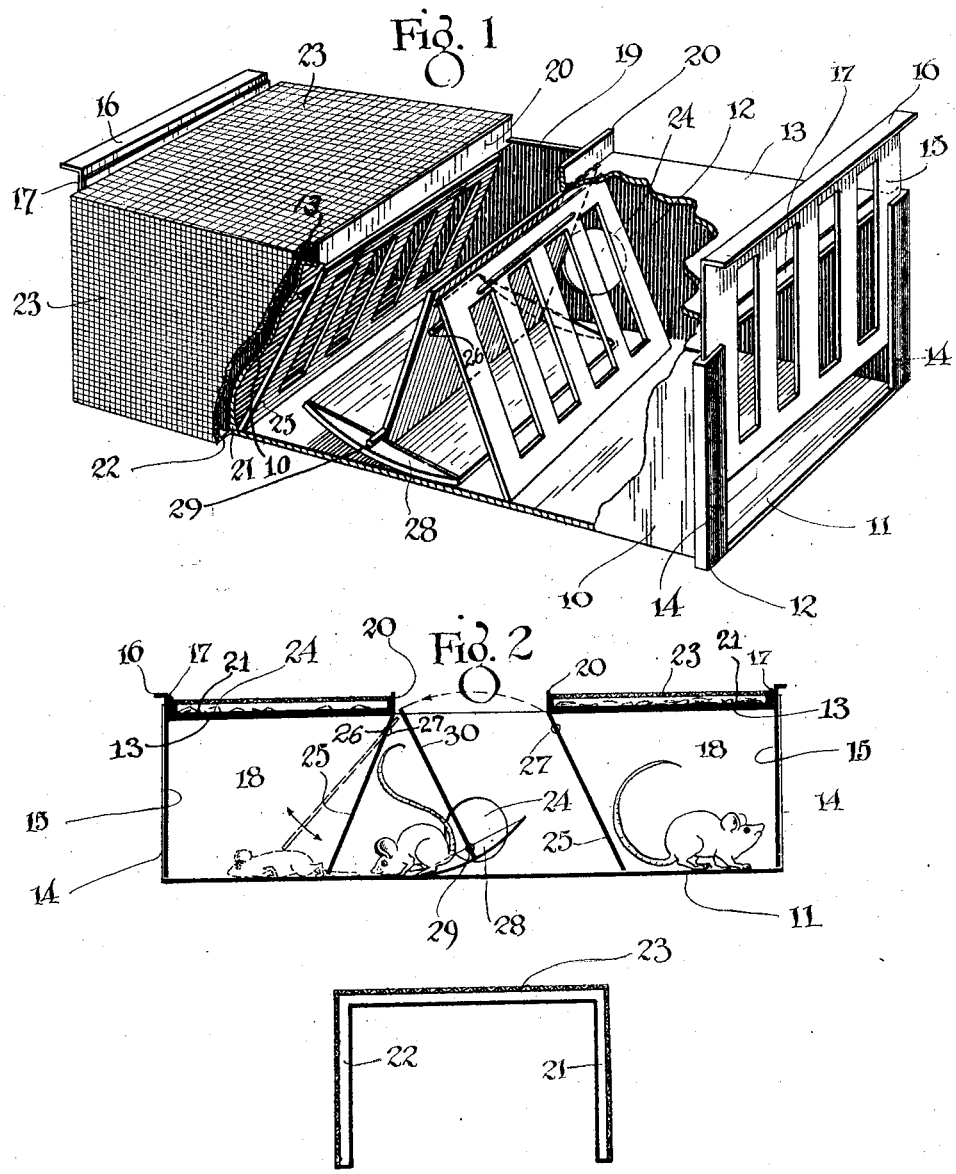

TIDO RUDOLPH SCHUIRMANN, OF CHENOA, ILLINOIS.

TRAP.

1,406,091.   Specification of Letters Patent.   Patented Feb. 7, 1922.

Application filed November 15, 1920. Serial No. 424,147.

*To all whom it may concern:*

Be it known that I, TIDO RUDOLPH SCHUIRMANN, a citizen of the United States, and a resident of Chenoa, in the county of McLean and State of Illinois, have invented certain new and useful Improvements in Traps, of which the following is a specification.

This invention relates to new and useful improvements in traps for catching rats, mice, and other rodents and the object of the invention is to provide an improved and simple construction of trap of the self set and ever set type.

A further object of the invention is to provide an improved sheet metal trap construction including two chambers or compartments for retaining the mice or other rodents therein, until it is desired to empty the trap or to immerse the same in hot water or the like, for drowning the mice or rodents, the trap being provided with a removable bait-holding device which will serve to attract the mice or rodents, but which will prevent their access thereto for eating the same, so that the bait device will last for a considerable period of time.

A further object of the invention is to provide an improved trap which can be made practically of sheet metal in its entirety, and which includes a novel form of trapping device which serves to positively catch the rodent and prevent the escape thereof, while also providing means for facilitating the emptying of the chamber in which the rodents are trapped, while permitting the device to be economically produced, in addition to rendering the same efficient in use, strong and durable.

Other objects of my invention will become readily apparent to persons skilled in the art, from a consideration of the following description when taken in conjunction with the accompanying drawings, wherein:—

Figure 1 is a perspective view of the trap with one side portion and top portion broken away to show the interior trapping structure, Figure 2 is a central longitudinal sectional view showing the operation of the device, and Figure 3 is a transverse sectional view of the bait holding device.

Referring to the drawings in detail, in which like reference characters indicate corresponding parts throughout the several views, my improved trap is shown as embodying a casing or box 10 preferably of rectangular elongated formation or oblong and formed with a bottom portion 11, sides 12 and a top 13. The ends of the casing are open, and formed at opposed sides with outwardly and inwardly directed portions forming guideways or grooves 14 which are open at the top and closed at the bottom by the bottom wall 11. These guides are adapted to receive the movable end portions or vertical slides 15 preferably having outwardly turned top edges or flanges 16 extending horizontally to form handles by which the slides or end portions may be slid into position or removed as desired. These slides or end portions are preferably made reticulated or slotted as indicated at 17, in order to permit the interior of the chambers 18 to be viewed, in addition to supply air thereto for ventilating purposes.

Intermediately, the top portion 13 is provided with an opening 19 extending entirely across the same, this opening being preferably of rectangular outline. The ends of the top portion 13 and at the edges of the opening 19 are provided with outwardly extending flanges or lips 20 cooperating to receive and retain in position suitable bait holding devices. As shown, these devices are in the form of inverted and substantially U-shaped open frames 21, preferably of sheet metal and having flanges 22 closing the ends and bottom edges thereof, a screen or like foraminous covering 23, which is disposed in spaced relation with respect thereto to form channels for receiving suitable bait, such as corn, which is indicated at 24, as being tightly packed therein and protected against access by the rodents so that the same cannot be eaten and will therefore last for a considerable length of time to attract the rats or other rodents. It will be seen that when the bait holding devices are in position, they will be retained against displacement by the flanges 14 and 20 and by snugly fitting the top and sides of the casing, will be prevented from jarring loose. However, they may be readily removed for renewing or refilling purposes, or when it is desired to empty the trap, or to immerse the trap in boiling water or the like for drowning or otherwise killing the rats.

In order to trap or catch the rodents, the casing besides being open at the top, as indicated at 19, is provided with openings 24 at the sides below said openings through which the animals may enter the trap. The compartments 18 are closed at their inner ends through the medium of hinged gates or doors 25 preferably of sheet metal and apertured to form reticulated transverse walls like the sides 15. The gates or plates forming the same are apertured at spaced points to receive a hinge pin or pintle 26 at a short distance from the upper edge thereof to engage apertures 27 in the sides of the casing, the gates being sufficiently long to prevent them from assuming a vertical position and to close against the bottom portion of the casing, as particularly indicated in Figure 2 of the drawings. In this manner, the compartments 18 are separated and will be automatically closed on the rodent entering either from the central compartment or space between said gates or doors.

The trapping device proper includes a relatively curved or concaved base 28 pivoted between the sides of the casing by a pivot rod 29 running through the center of the base transversely and properly fitting between the side walls of the casing. This pivot is located at the lower end of an upright or transverse partition 30 which extends to the front portion of the casing at the opening 19 and is adapted when the animal or rodent steps thereon at either side, to precipitate the animal into the corresponding compartment 18 through the gates 25 which are swung upwardly in the manner indicated in dotted lines in Figure 2 of the drawings, the upright or partition 30 serving to close the top opening 19 at the same time, whereby the escape of the animal is prevented through the top of the casing or through the openings 24 at the sides. As the gate 25 at either side will drop of its weight to a closed position, as shown in full lines in Figures 1 and 2, the sides 15 will afford the only means of escape which are fully under the control of the user. It will also be noted that the upright or partition 30 cooperates with the flanges 20, so as to be limited in its movement in swinging on the pivot 29, thus preventing the inoperation of the trap and insuring the return thereof to a normal inclined position against the action of the concaved base 28, so that the trap is automatically set and is always in condition for use. It will also be apparent that when the animal steps on the base that the trap may swing from one side to the other, but always toward that side on which the animal is disposed. It will of course be understood that the base and upright will be tipped by the weight of the animal, the moment it steps on the base and will be retained in such tipped or inclined position, thus providing a trap which is self-acting or setting. It will also appear that the animal being caught by the tipping of the base and the upright, will in seeking escape, force either one of the gates 25 upward in order to get into one of the compartments 18 and the automatic closing of the gates 25 immediately on the passage of the animal into said compartment, will insure the safe retention of the animal until it is desired to empty the trap by means of the slides 15 or to remove the bait holding device and immerce the trap in hot water for drowning the animals, in case a person hesitates to open the slide. Once the animal is in either of the compartments 18, the device is in position for further operation without being interfered with or disturbed by the animals previously caught. The object of removing the bait device, is to keep the bait dry and the screen from rusting, thereby permitting the re-use of the bait device.

In view of the foregoing, it is thought that the operation of the device will be readily understood, and in view of the simplicity and practical value, that it will commend itself to those skilled in the art.

Having thus described my invention, what I claim is:—

1. The combination with a trap including a rectangular casing having a trapping device and a door; of a bait device of substantially U-shape in cross section removably held on said casing and provided with an imperforate inner panel, a screened covering forming a channel between the panel and the screen to receive corn or other bait.

2. A rat trap comprising a casing having an opening therein, a trapping device beneath said opening, a gate at one side of said trapping device and opening away from the same, a door at the opposite end of the casing and normally closed to prevent the escape of the animal, said casing having flanges at said opening and a paneled bait device having an imperforate bottom portion and a foraminous cover to hold the bait such as corn therein, said bait device being fitted between said flanges and engaging the top and sides of the casing.

3. A rat trap comprising a casing having an opening therein, a trapping device beneath said opening, a gate at one side of said trapping device and opening away from the same, and a removable slide at the opposite end of the casing, said casing having flanges at said opening and a paneled bait device having a foraminous cover, fitted between said flanges.

4. A rat trap comprising an elongated rectangular casing having a transverse opening in the top thereof provided with upturned flanges at either side, the ends of the casing being open and provided with guideways at either side and upwardly extending flanges at the top, removable bait devices engaged between said flanges at either side of the opening and against the top and sides of the casing, slides engaged in said guideways and having top flanges forming handles, gates pivoted between the sides of the casing outwardly of the opening in the top and opening outwardly, said gates when closed being in inclined positions, a base pivoted between the sides of the casing near the bottom and between the gates, and an upright on the base adapted to close the opening in the top at the side toward which it tilts.

5. A rat trap comprising an elongated rectangular casing having a transverse opening in the top thereof centrally between the ends and provided with upturned flanges at either side, and upwardly extending flanges at the top, removable bait devices engaged between said flanges at either side of the opening and against the top and sides of the casing, doors at the ends of the casing and normally retained against displacement, gates pivoted between the sides of the casing outwardly of the opening in the top and opening outwardly, a base pivoted between the sides of the casing and between the gates, and an upright on the base adapted to close the opening at the top when tilted.

TIDO RUDOLPH SCHUIRMANN.